March 18, 1952 — O. J. LE BOEUF — 2,589,408
EGG BREAKER AND SEPARATOR
Filed April 7, 1950 — 2 SHEETS—SHEET 1
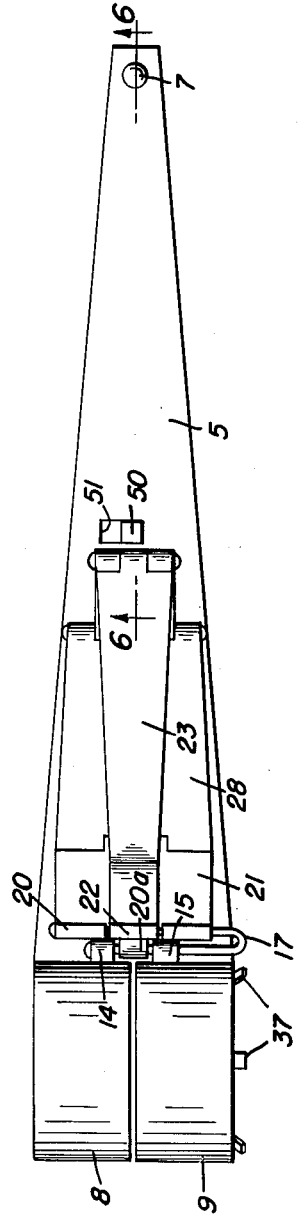
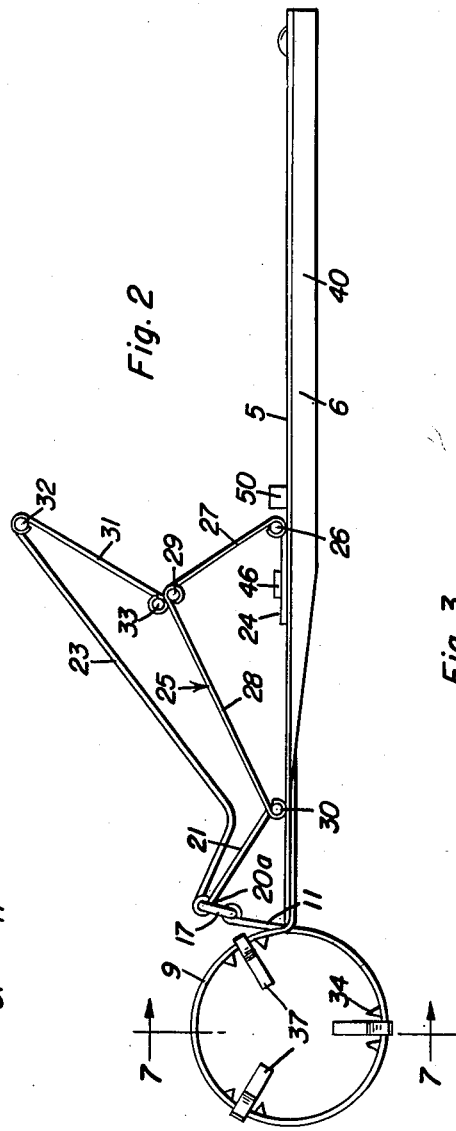
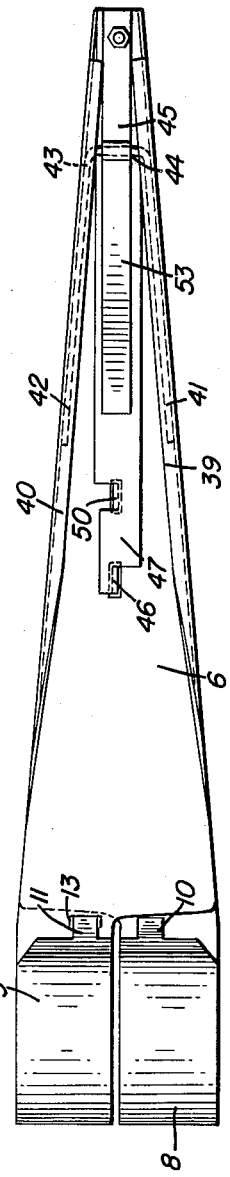
Oscar J. LeBoeuf
INVENTOR.

March 18, 1952  O. J. LE BOEUF  2,589,408
EGG BREAKER AND SEPARATOR
Filed April 7, 1950  2 SHEETS—SHEET 2
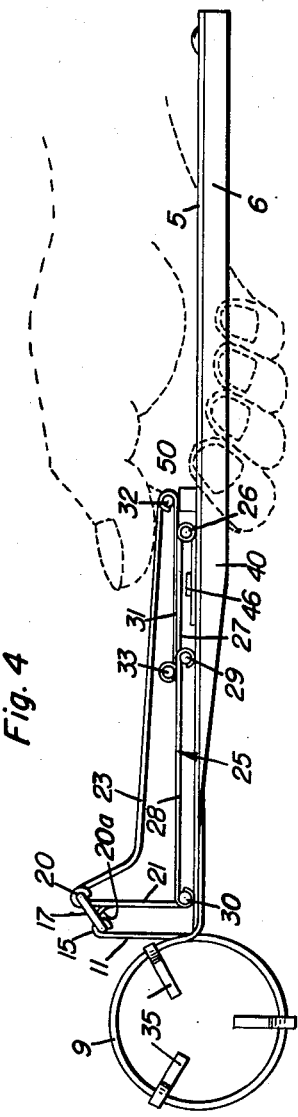
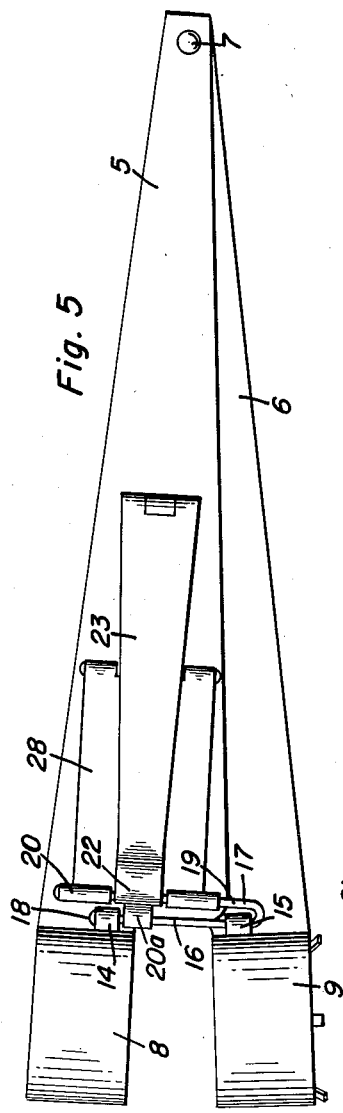
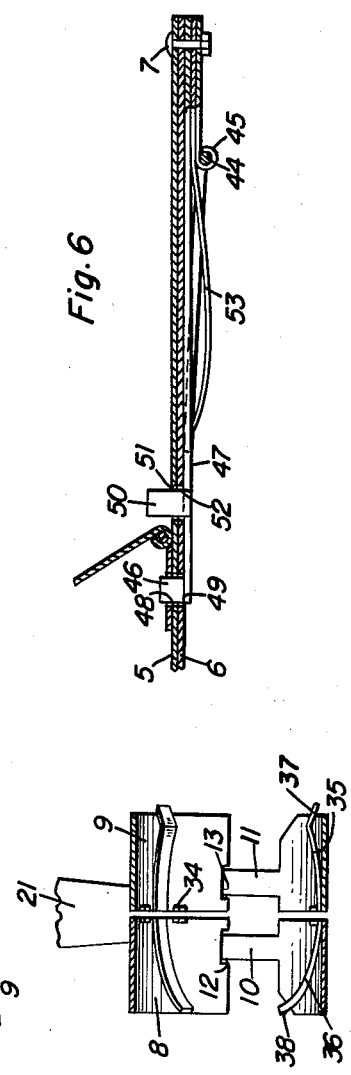
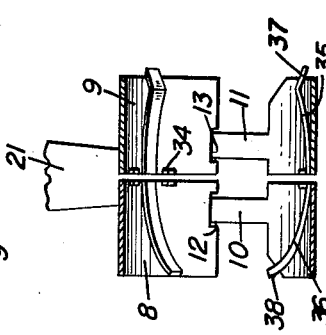
Oscar J. LeBoeuf
INVENTOR.

Patented Mar. 18, 1952

2,589,408

UNITED STATES PATENT OFFICE 2,589,408

EGG BREAKER AND SEPARATOR

Oscar J. Le Boeuf, Gary, Ind.

Application April 7, 1950, Serial No. 154,492

6 Claims. (Cl. 146—2)

The present invention relates to new and useful improvements in egg breakers and separators and more particularly to a device for holding, breaking and separating an egg by a single movement of an operating lever carried by a handle for the device.

An important object of the invention is to provide a pair of annular contractible egg holding members in alined position at one end of a pair of pivoted handles and formed with internal cutters for breaking the egg, the handles being spring actuated to move the egg holding members away from each other into open position for separating the broken egg and having trigger released locking means, and further providing lever operating means for initially contracting the egg holding members to break the egg and subsequently releasing the locking means to open the egg holding members into egg separating position.

- Another object is to provide a device of this character wherein the handle may be held in one hand while the lever is actuated by the thumb, thus leaving the other hand free for other purposes.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view;

Figure 3 is a bottom plan view;

Figure 4 is a side elevational view showing the lever depressed for contracting the egg holding members;

Figure 5 is a top plan view showing the egg holding members released in open position;

Figure 6 is an enlarged fragmentary longitudinal sectional view taken on a line 6—6 of Figure 1; and Figure 7 is an enlarged transverse sectional view of the egg holding members taken on a line 7—7 of Figure 2.

Referring now to the drawings in detail, wherein for the purpose of illustration I have disclosed a preferred embodiment of my invention, the numerals 5 and 6 designate a pair of handles of suitable metal positioned in superposed relation to each other and pivoted to each other at their rear ends by a bolt and nut or the like 7.

Handle 5 is on top and is formed at its free end with a ring forming an annular egg holder 8 and handle 6 is similarly formed at its free end with an annular axially alined egg holder 9, the axis of the egg holders being at right angles to the longitudinal axis of the handles.

Egg holders 8 and 9 are split transversely and are formed at their free ends with tongues 10 and 11 respectively slidable in openings 12 and 13 at the united portions of the egg holders and the ends of the tongues are formed with eyes 14 and 15 respectively pivotally and slidably positioned on the front leg 16 of a transverse U-shaped wire link 17. Eye 14 is positioned outermost on leg 16 and held thereon by upsetting or otherwise enlarging the outer end of the leg, as shown at 18.

The rear leg 19 of U-shaped link 17 is pivoted in a pair of eyes 20 at one end of a sheet metal link 21 and rear leg of link 17 is also pivoted on a single eye 22 at the upwardly curved front end of upper sheet metal lever 23. Link 21 is also formed with a single eye 20a pivoted on the front leg of link 17.

A plate 24 is soldered or otherwise suitably secured on top of handle 5 to which the rear end of a lower sectional foldable lever 25 is pivoted by a hinge pin 26. Lower lever 25 includes a rear section 27 and a front section 28 hingedly connected to each other by a center hinge pin 29 and the front end of front section 28 is pivotally connected to the lower end of link 21 by a hinge pin 30 which slides on top of handle 5.

A sheet metal link 31 is pivoted at one end to the rear end of upper lever 23 by a hinge pin 32 and the other end of link 31 is pivoted to lower lever 25 in the region of center hinge pin 29 by a hinge pin 33.

The egg holders 8 and 9 are formed with internal cutters or teeth 34 adjacent their meeting edges, and resilient egg gripping fingers 35 and 36 are soldered or otherwise suitably secured at one end internally of the respective egg holders, the free ends of fingers 35 being flared, as at 37, to guide an egg into the holders and the free ends of fingers 36 are curved inwardly, as shown at 38, to obstruct passage of the egg therethrough.

The outer side edges of handles 5 and 6 are formed with downturned flanges 39 and 40 against which the side portions 41 and 42 of a U-shaped wire spring 43 are held under tension to swing the handles laterally into an open position. The bight portion 44 of spring 43 is secured to the underside of handle 6 by a clip 45 secured to bolt and nut 7.

The handles are locked in closed position by an upstanding dog 46 at the front end of a resilient metal strap 47, and with the rear end of the strap attached to bolt and nut 7. The dog 46 is engaged in alined openings 48 and 49 in handles 5 and 6 and an upstanding trigger 50 is also carried by strap 47 to enter a second pair of alined openings 51 and 52 in handles 5 and 6 rearwardly of dog 46 and rearwardly of lower lever 25. Opening 51 in upper handle 5 comprises a slot to avoid obstructing opening movement of the handles. A leaf spring 53 is also secured at one end to bolt and nut 7 and with its free end bearing against the underside of strap 47 to hold the dog 46 and trigger 50 in a raised locking position in handles 5 and 6.

In the operation of the device, locking dog 46 holds handles 5 and 6 and egg holders 8 and 9 in a closed end to end position, as shown in Figure 1, and an egg is then inserted in the holders at the flared ends 37 of spring fingers 35 and 36 which grip the opposite ends of the egg. The placing of the egg in holders 8 and 9 expands the same to pull tongues 10 and 11 downwardly to swing upper lever 23 upwardly and sliding hinge pin 30 breaks lower lever 25 at its hinge 29 to also raise the central position of lower lever, as shown in Figure 2.

Handles 5 and 6 are grasped in the hand of a person and upper lever 23 is depressed by the thumb, as shown in Figure 4.

The downward movement of upper lever 23 also forces lower lever 25 downwardly sliding hinge pin 30 forwardly and link 21 swings into an upright position pulling tongues 10 and 11 upwardly to contract egg holders 8 and 9 and forcing prongs or teeth into the egg to break the egg at its center.

The continued downward movement of lever 23 brings its rear end into engagement with trigger 50 and depresses the trigger to release dog 46 from handles 5 and 6 and spring 43 then swings the handles on pivot 7 to move egg holders 8 and 9 away from each other into an open position, and while the broken halves of the egg are held in the egg holders the egg white and yolk may then be separated.

The spring tension of egg holders 8 and 9 expands the same to raise levers 23 and 25 and the handles 5 and 6 are closed by squeezing the same and spring 53 then again locks dog 46 in openings 48 and 49.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described as preferred embodiment of the invention the same is susceptible to certain changes fully comprehended by the spirit of the invention as herein described and the scope of the appended claims.

Having described the invention, what is claimed as new is:

1. An egg breaker and separator comprising a pair of handles pivotally connected at their inner ends to each other, a pair of contractible annular egg holders at the outer ends of the handles axially alined with each other, means internally of the egg holders for breaking the shell of an egg placed therein, and lever means carried by one of the handles and connected to the egg holders for contracting the latter to break the egg, said lever means comprising a rigid upper lever and a foldable lower lever positioned longitudinally of the handle and actuated by a depressing movement subjected to the upper lever, means connecting the outer end of the upper lever to both of the egg holders, means pivotally connecting the inner end of the lower lever to the handle, a link pivotally connecting the inner end of the upper lever to the lower lever at its foldable portion, and a link pivotally connecting the outer ends of the levers to each other.

2. In an egg breaker and separator, the combination of a pair of handles pivotally connected to each other at their inner ends, spring means moving the outer ends of the handles into open position, means locking the handle in closed position, a pair of contractible egg holders at the outer ends of the handles held closed one against the other by the handles and having internal egg breaking means, and a single means carried by one of the handles for simultaneously contracting both of the egg holders to break an egg therein, said handle locking means being positioned in the path of said last-named means during the egg holder contracting movement of the latter for releasing said handle locking means to open the handles and to separate the egg holders.

3. In an egg breaker and separator, the combination of a pair of handles pivotally connected to each other at their inner ends, spring means moving the outer ends of the handles into open position, means locking the handles in closed position, a pair of contractible egg holders at the outer ends of the handles held closed one against the other by the handles and having internal egg breaking means, and means carried by one of the handles for contracting the egg holders to break an egg therein, said last named means comprising a depressible member connected to the egg holders to contract the latter upon an initial depressing movement and said handle locking means being positioned in the path of said last-named means for releasing the former upon completion of a depressing movement of the latter to open the handles and separate the egg holders from each other.

4. In an egg holder and separator, the combination of a pair of handles pivotally connected to each other at one end, spring means swinging the handles away from each other, means locking the handles to each other, an annular contractible egg holder at the free end of each handle axially alined with each other and held in end to end relation by the handles, internal egg breaking means in the holders, and means carried by one of the handles operated by a depressing movement for initially contracting the holders to break an egg therein at its center and said locking means being positioned in the path of depressing movement of said last named means for subsequently releasing said locking means to separate the egg holders.

5. In an egg holder and separator, the combination of a pair of handles pivotally connected to each other at one end, spring means swinging the handles away from each other, means locking the handles to each other, an annular contractible egg holder at the free end of each handle axially alined with each other and held in end to end relation by the handles, internal egg breaking means in the holders, internal egg gripping means in the holders for gripping each end of the egg, and means carried by one of the handles operated by a depressing movement for initially contracting the holders to break an egg therein at its center and said locking means being positioned in the path of depressing movement of said last named means for subsequently releasing said locking means to separate the egg holders.

6. An egg breaker and separator comprising a pair of handles pivotally connected at their inner ends to each other, a pair of contractible annular egg holders at the outer ends of the handles axially alined with each other, means internally of the egg holders for breaking the shell of an egg placed therein, a tongue projecting rearwardly from each egg holder, lever means carried by one of the handles, and a U-shaped connector having its legs positioned transversely of the handles and pivotally connected respectively to said tongues and to said lever means for contracting the egg holders.

OSCAR J. LE BOEUF.

REFERENCES CITED

The following references are of record in the file of this patent:

UNITED STATES PATENTS

| Number | Name | Date |
| --- | --- | --- |
| 426,281 | King | Apr. 22, 1890 |
| 1,611,541 | McCrocklin | Dec. 21, 1926 |
| 1,865,619 | Dammrich | July 5, 1932 |
| 2,130,623 | Hines et al. | Sept. 20, 1938 |
| 2,247,016 | Halas | June 24, 1941 |